United States Patent
Espenes et al.

(10) Patent No.: US 7,110,967 B1
(45) Date of Patent: Sep. 19, 2006

(54) METHOD FOR REFINING AN ONLINE MARKETPLACE SELECTION FOR ENHANCING E-COMMERCE

(75) Inventors: Bjorn Espenes, Sandy, UT (US); Terry Haas, Sandy, UT (US); Jalali Hartman, Salt Lake City, UT (US); Eric Maas, Salt Lake City, UT (US)

(73) Assignee: Infopia, Inc., Salt Lake City, UT (US)

( * ) Notice: Subject to any disclaimer, the term of this patent is extended or adjusted under 35 U.S.C. 154(b) by 0 days.

(21) Appl. No.: 09/633,050

(22) Filed: Aug. 4, 2000

(51) Int. Cl.
G06Q 30/00 (2006.01)
G06F 17/30 (2006.01)

(52) U.S. Cl. .......................................... 705/26; 705/27
(58) Field of Classification Search .................. 705/26, 705/27, 14
See application file for complete search history.

(56) References Cited

U.S. PATENT DOCUMENTS

| | | | |
|---|---|---|---|
| 4,703,423 A | 10/1987 | Bado et al. | 364/400 |
| 4,789,235 A | 12/1988 | Borah et al. | 351/246 |
| 4,850,007 A | 7/1989 | Marino et al. | 379/67 |
| 5,099,422 A | 3/1992 | Foresman et al. | 364/401 |
| 5,105,184 A | 4/1992 | Pirani et al. | 340/721 |
| 5,220,501 A | 6/1993 | Lawlor et al. | 364/408 |
| 5,305,195 A | 4/1994 | Murphy | 364/401 |
| 5,319,542 A | 6/1994 | King, Jr. et al. | 364/401 |
| 5,347,632 A | 9/1994 | Filepp et al. | 395/200 |
| 5,377,354 A | 12/1994 | Scannell et al. | 395/650 |
| 5,442,771 A | 8/1995 | Filepp et al. | 395/650 |
| 5,446,919 A | 8/1995 | Wilkins | 455/6.2 |
| 5,515,270 A | 5/1996 | Weinblatt | 364/405 |
| 5,537,314 A | 7/1996 | Kanter | 364/406 |
| 5,566,353 A | 10/1996 | Cho et al. | 455/2 |
| 5,584,025 A | 12/1996 | Keithley et al. | 395/615 |
| 5,590,197 A | 12/1996 | Chen et al. | 380/24 |
| 5,594,910 A | 1/1997 | Filepp et al. | 395/800 |
| 5,636,346 A | 6/1997 | Saxe | 395/201 |
| 5,715,399 A | 2/1998 | Bezos | 395/227 |
| 5,717,923 A | 2/1998 | Dedrick | 395/613 |
| 5,724,521 A | 3/1998 | Dedrick | 395/226 |
| 5,727,163 A | 3/1998 | Bezos | 395/227 |

(Continued)

FOREIGN PATENT DOCUMENTS

WO    WO 02/01459    * 1/2002

OTHER PUBLICATIONS

McBee offers Website Templates, Accounting Technology, Boston. Mar. 2000, vol. 16, Issue 2, p. 14.*

Primary Examiner—Matthew S Gart
(74) Attorney, Agent, or Firm—Fenwick & West LLP

(57) ABSTRACT

A method and system for enhancing e-commerce transactions by placing product marketing information in front of targeted potential customers by analyzing the product, mapping it to one or more product categories, creating dynamic e-commerce Web sites for the product, selecting appropriate e-commerce marketplaces based on previous placement results and client-product objectives, placing the created e-commerce Web site on the appropriate e-commerce marketplaces, collecting data based on activity on the placed Web sites, and updating either or both of the created dynamic e-commerce Web sites or the e-commerce marketplace selection criteria. This invention also manages the transactions associated with the e-commerce facilitated by the process of placing the product information on the selected marketplaces. An e-mail manager is also provided to communicate with buyers and potential buyers as well as product clients.

16 Claims, 15 Drawing Sheets

U.S. PATENT DOCUMENTS

| | | | |
|---|---|---|---|
| 5,729,594 A | 3/1998 | Klingman | 379/93.12 |
| 5,740,549 A | 4/1998 | Reilly et al. | 705/14 |
| 5,764,601 A | 6/1998 | Murakami et al. | 369/13 |
| 5,768,521 A | 6/1998 | Dedrick | 395/200.54 |
| 5,796,945 A | 8/1998 | Tarabella | 395/200.9 |
| 5,862,223 A | 1/1999 | Walker et al. | 380/25 |
| 5,930,769 A | 7/1999 | Rose | 705/27 |
| 5,933,811 A | 8/1999 | Angles et al. | 705/14 |
| 5,949,044 A | 9/1999 | Walker et al. | 235/379 |
| 5,954,582 A | 9/1999 | Zach | 463/25 |
| 5,987,464 A | 11/1999 | Schneider | 707/10 |
| 5,987,480 A | 11/1999 | Donohue et al. | 707/501 |
| 5,991,751 A | 11/1999 | Rivette et al. | 707/1 |
| 6,026,368 A | 2/2000 | Brown et al. | 705/14 |
| 6,029,141 A * | 2/2000 | Bezos et al. | 705/27 |
| 6,049,787 A | 4/2000 | Takahashi et al. | 705/44 |
| 6,058,417 A | 5/2000 | Hess et al. | 709/219 |
| 6,067,532 A | 5/2000 | Gebb | 705/37 |
| 6,502,076 B1 * | 12/2002 | Smith | 705/14 |
| 6,714,975 B1 * | 3/2004 | Aggarwal et al. | 709/224 |
| 6,826,594 B1 * | 11/2004 | Pettersen | 709/203 |

* cited by examiner

METHOD FOR REFINING AN ONLINE MARKETPLACE SELECTION FOR ENHANCING E-COMMERCE

BACKGROUND OF THE INVENTION

1. Field of the Invention

This invention relates to methods and system for on-line selling. More specifically, this invention relates to methods and systems for on-line selling, which identifies targeted buyers and places on-line product marketing information at the preferred on-line locations of the targeted buyers.

2. Description of Related Art

A variety of different on-line marketing and/or selling systems are well known in the art, however, typically these previous methods require the potential buyer to find the web site where the product information is posted.

The reader is referred to the following U.S. patent documents for general background material: U.S. Pat. Nos. 4,703,423, 4,789,235, 4,850,007, 5,099,422, 5,105,184, 5,220,501, 5,305,195, 5,319,542, 5,347,632, 5,377,354, 5,442,771, 5,446,919, 5,515,270, 5,537,314, 5,566,353, 5,584,025, 5,590,197, 5,594,910, 5,636,346, 5,715,399, 5,717,923, 5,724,521, 5,727,163, 5,729,594, 5,740,549, 5,764,601, 5,768,521, 5,796,945, 5,862,223, 5,930,769, 5,933,811, 5,949,044, 5,954,582, 5,987,464, 5,987,480, 5,991,751, 6,026,368, 6,029,141, 6,049,787, 6,058,417 and 6,067,532. Each of these patent documents is hereby incorporated by reference in its entirety for the material container therein.

SUMMARY OF THE INVENTION

It is desirable to provide a method and system that facilitates the automated on-line selling services by placing product promotional materials in on-line locations where targeted buyers are likely to encounter them. It is also desirable to collect data on product attributes and e-commerce activity.

Therefore, it is an object of this invention to provide a method and system for enhancing automated on-line selling services by placing product information on the world-wide-web in front of targeted buyers.

It is another object of this invention to provide a method and system for enhancing on-line selling that includes collecting data on product attributes and e-commerce activity.

A further object of this invention is to provide a method and system for enhancing on-line selling that creates e-commerce relationships with product vendors, including e-retailers, manufacturers, and/or brick-and-mortar resellers.

Another object of this invention is to provide a method and system for enhancing on-line selling that creates an electronic inventory of items to be sold, which includes agreed upon information and identification.

A still further object of this invention is to provide a method and system for enhancing on-line selling that dynamically creates "Product Pages" for each product, using content derived dynamically.

It is another object of this invention to provide a method and system for enhancing on-line selling that automatically posts product information to a variety of e-commerce marketplaces, including, but not necessarily limited to auctions, community sites, e-malls, on-line classifieds, on-line exchanges, order aggregation sites and virtual marketplaces and comparison shopping sites.

It is a still further object of this invention to provide a method and system for enhancing on-line selling that dynamically creates an on-line product catalog to reflect current products and prices.

It is a further object of this invention to provide a method and system for enhancing on-line selling that includes an automated e-mail communication process for conducting transactions.

A still further object of this invention is to provide a method and system for enhancing on-line selling that includes a variety of management data reporting tools.

Another object of this invention is to provide a method and system for enhancing on-line selling that includes a method of setting and adjusting evaluation criteria based on client preferences as well as collected data.

These and other objects of the invention are achieved by the method and system herein described and are readily apparent to those of ordinary skill in the art upon review of the following drawings, detailed description and claims.

BRIEF DESCRIPTION OF THE DRAWINGS

In order to show the manner that the above recited and other advantages and objects of the invention are obtained, a more particular description of the preferred embodiments of this invention, which is illustrated in the appended drawings, are described as follows. The reader should understand that the drawings depict only a present preferred and best mode embodiment of this invention, and are not intended to be considered as limiting in scope. A brief description of the drawings is as follows.

Reference will now be made in detail to the present preferred embodiment of the invention, examples of which are illustrated in the accompanying drawings.

DETAILED DESCRIPTION OF THE INVENTION

This invention is a method and system for facilitating and enhancing the placement of product marketing on e-commerce Internet sites. By gathering information on the activity of product marketing placement, evaluating such information and using the evaluation of the information to refine the product marketing placement of present and future products. This invention provides the complete e-commerce solution, including receiving product and client information, mapping product data to market place scheme, producing dynamic product data web sites, placing such dynamic product web sites on selected web market places, tracking activity on placed product web sites, performing e-commerce transactions, reporting results to clients, developing filters to refine market place broadcasting, and e-mail follow-up messaging.

Figure 1:
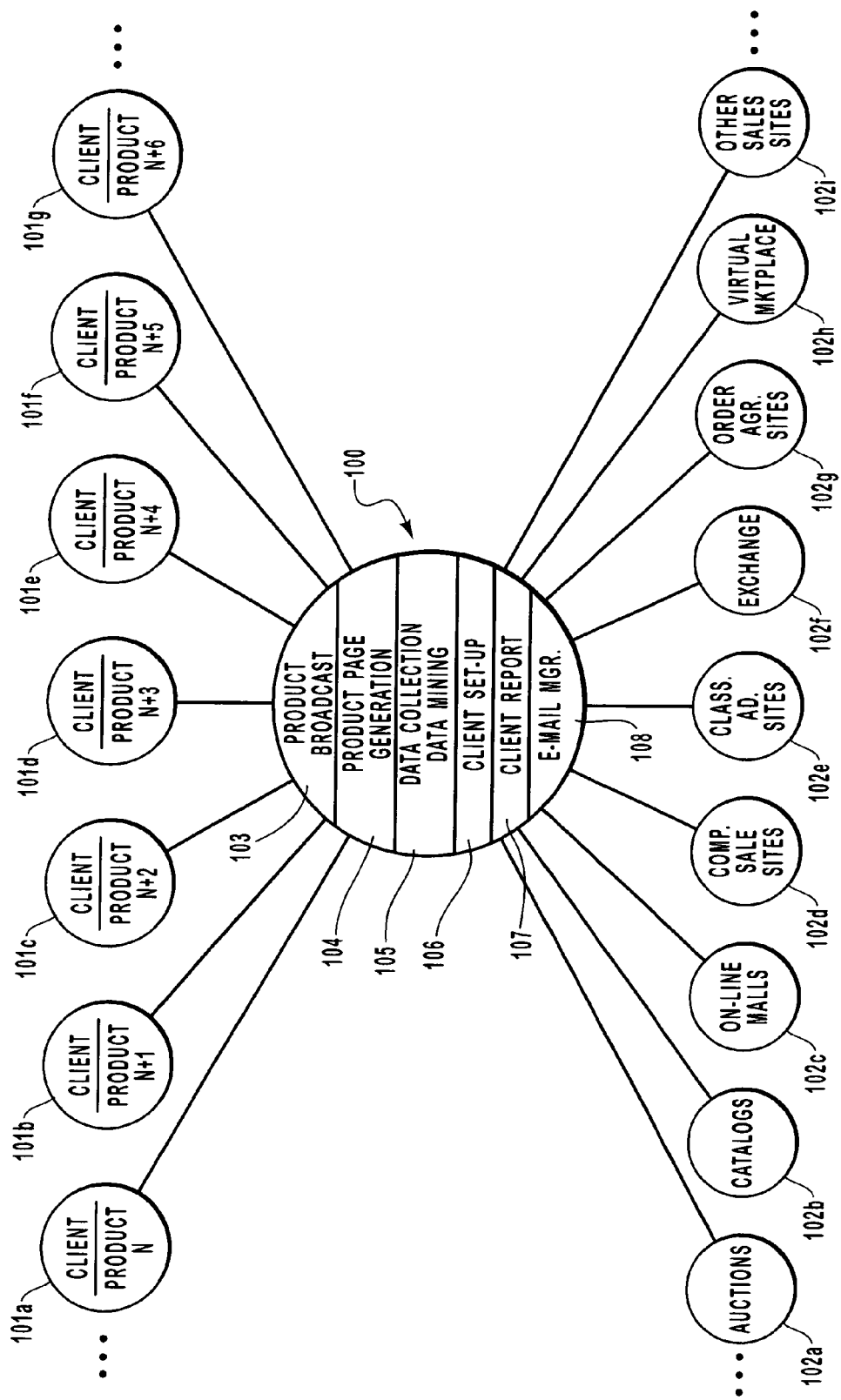
FIG. 1 is a schematic of the relationships of this invention.

FIG. 1 depicts a schematic of the relationships of this invention. As shown here this invention 100 is positioned between the suppliers of products 101a–g and e-commerce marketing sites 102a–i. For the purposes of this disclosure the term "client" shall be defined to be the person, company or organization which has products to sell; the term "product" shall be defined to mean goods, services, financial instruments and/or information; the term "e-commerce" shall be defined to mean transactions whether financial, barter or other, which makes use of electronic communications channels, typically currently understood to be the World-Wide-Web or the Internet (each of which for the purposes of this disclosure shall be considered as synonyms); the term "web pages" shall be defined to mean organized information presented using the World-Wide-Web or the Internet.

This invention solves a fundamental e-commerce inefficiency, namely that while the Internet is constantly changing Internet product placement marketing is either static or requires specific intensive human labor to keep updating the placement of the product marketing on the sites. Moreover, this invention addresses the problem of ensuring that Internet product information is placed at Web sites where the likely product purchasers are most likely to encounter them. Although there is a very high volume of access traffic on the World-Wide-Web (the "Web"), generally this traffic is concentrated on access to a relatively small number of large sites and portals. Nevertheless, products are generally spread out over an almost infinite number of on-line seller specific Web sites. Simply put, this invention addresses the problem that products and Internet traffic (or buyers) are not located on the Web in the same places.

This invention is a method and system for providing an automated on-line selling service that generates transactions by bringing together products and buyers. Client's products are analyzed and mapped to the most appropriate Internet locations, or market places 102i. Such Internet market places 102a–i currently include such Internet sites or portals as on-line malls, auction sites, on-line classifieds, on-line communities, comparative pricing sites, and the like. Currently, such companies as Amazon, E-bay and Yahoo maintain such sites. In its current preferred embodiment, this invention supports the product placement of many hundreds of thousands of products on any appropriate Internet sites. For each product placement, the present embodiment of this invention collects and stores approximately 50 data elements, as well as client specific information used in evaluating the performance of the system in meeting client objectives. Activity on each product placement can generate tens of thousands of statistics per week. These statistics are mined by this invention to automatically evaluate and improve its performance, both for a specific product placement and future product placements. These statistics are also used to generate activity reports for clients. An e-mail process is provided to contact buyers and potential buyers either for direct solicitations, customer satisfaction surveys or follow-up. In its present preferred embodiment, the process of this invention is written in Java, Java servlets, JSP, and JSQL and executes on an Oracle 8i database platform. The software used in the present preferred embodiment currently runs on the Linux operating sytem and is designed to be hardware platform independent and to be highly scalable.

This invention provides two major benefits: reduced customer acquisition cost and increased e-commerce sales. Customer acquisition cost reduction is achieved by broadcasting products to numerous selected e-market places, which deliver high volume, targeted traffic. Increased revenue from e-commerce sales results from leveraging transaction data that is collected, stored, mined and evaluated, by this invention, to detail where, when and at what price client products are selling. The placement of Internet marketing information is continuously improved by applying this transaction data, thereby continually improving selling effectiveness.

Within the system of this invention are three primary components: Product Broadcasting 103; Product Page Generation 104; and Data Collection/Data Mining 105. Additional components of this invention include: Client Set-up 106, Client Reporting 107, and e-mail manager 108.

The Product Broadcasting 103 component performs the function of listing a client product 101 on one or more targeted, high traffic e-commerce market places 102 where product sales are facilitated. In the present preferred embodiment of this invention the e-commerce market places targeted include online auction sites 102a, online catalogs 102b, Internet malls 102c, comparison shopping sites 102d, online classified advertisement sites 102e, online exchanges 102f, order aggregation sites 102g, virtual marketplaces 102h and other similar sites 102i. Some of the current marketplaces identified for targeting by this invention include: e-bay, yahoo!, amazon.com, fairmarket, boxlot, msn, lycos auctions, eDeal, Auctions.com, 321Gone, GoTo, 2theMart, MySimon, GoTo Shop, Auction Rover, Nextag, CNET, ShopMarket, Addashop.com, Vstore.com, PointClick, VerticalNet, NorthSky, WebLoyalty, OrderTrust, Microsoft bCentral, Onvia.com, Tradeout.com, RedTagBiz, DoveBid, Liquidation.com, WholesaleCentral.com, Close-Out-News.com, ValueAmerica.com, Roxy.com, Barnes & Noble, TurboPrice.com, Jewelry.com and excite. The system of this invention uses the information in a data repository to optimize the channel selection and mapping for each client and/or product. This e-commerce market channel selection is adjusted on an ongoing basis as the data collection increases. Posting and transaction data are used with the client information/objectives to generate performance reports, which are utilized to continually refine product-listing strategies for each client.

Figure 6A:
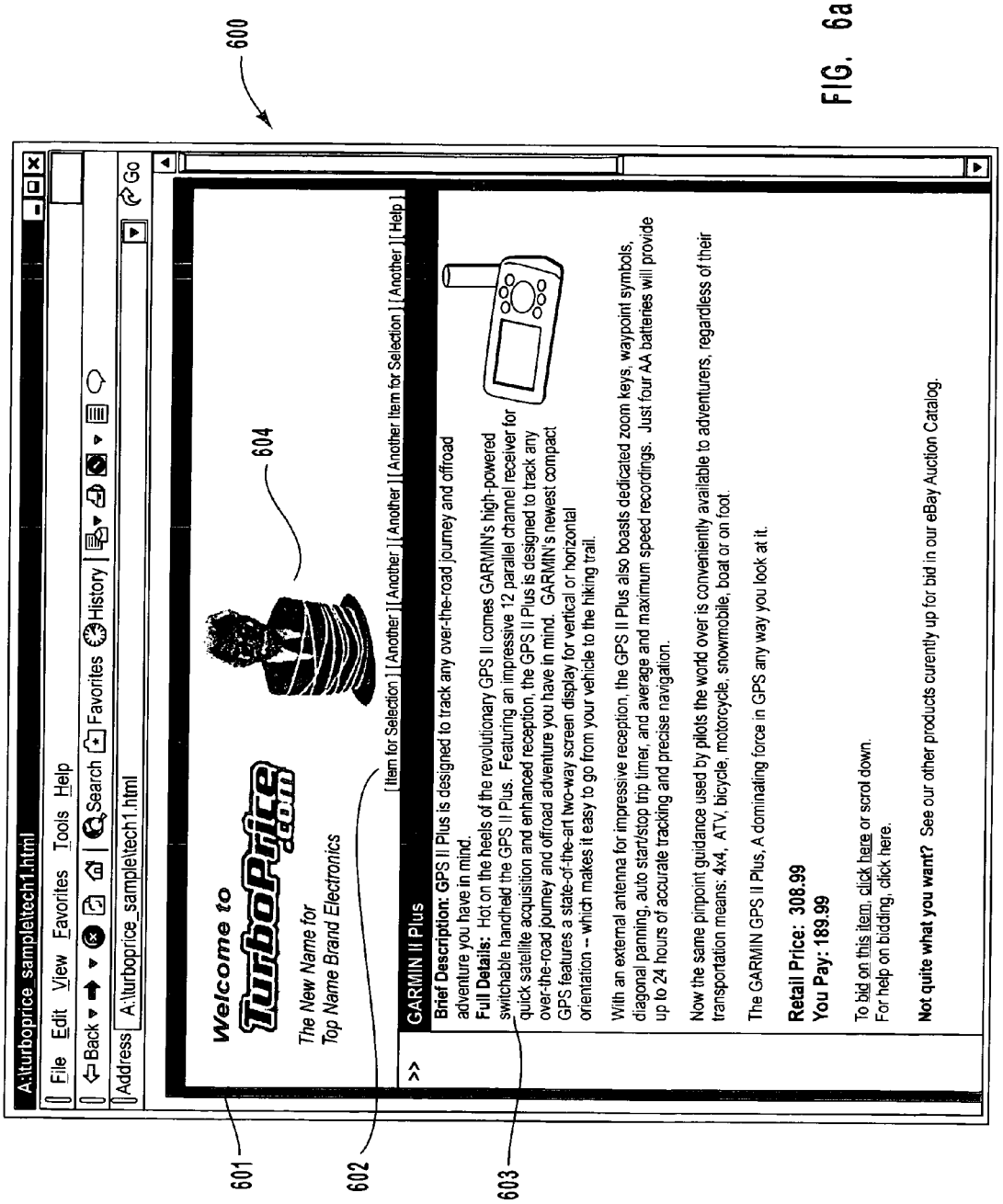
FIGS. 6a and 6b are a representative product page used in this invention.
Figure 6B:
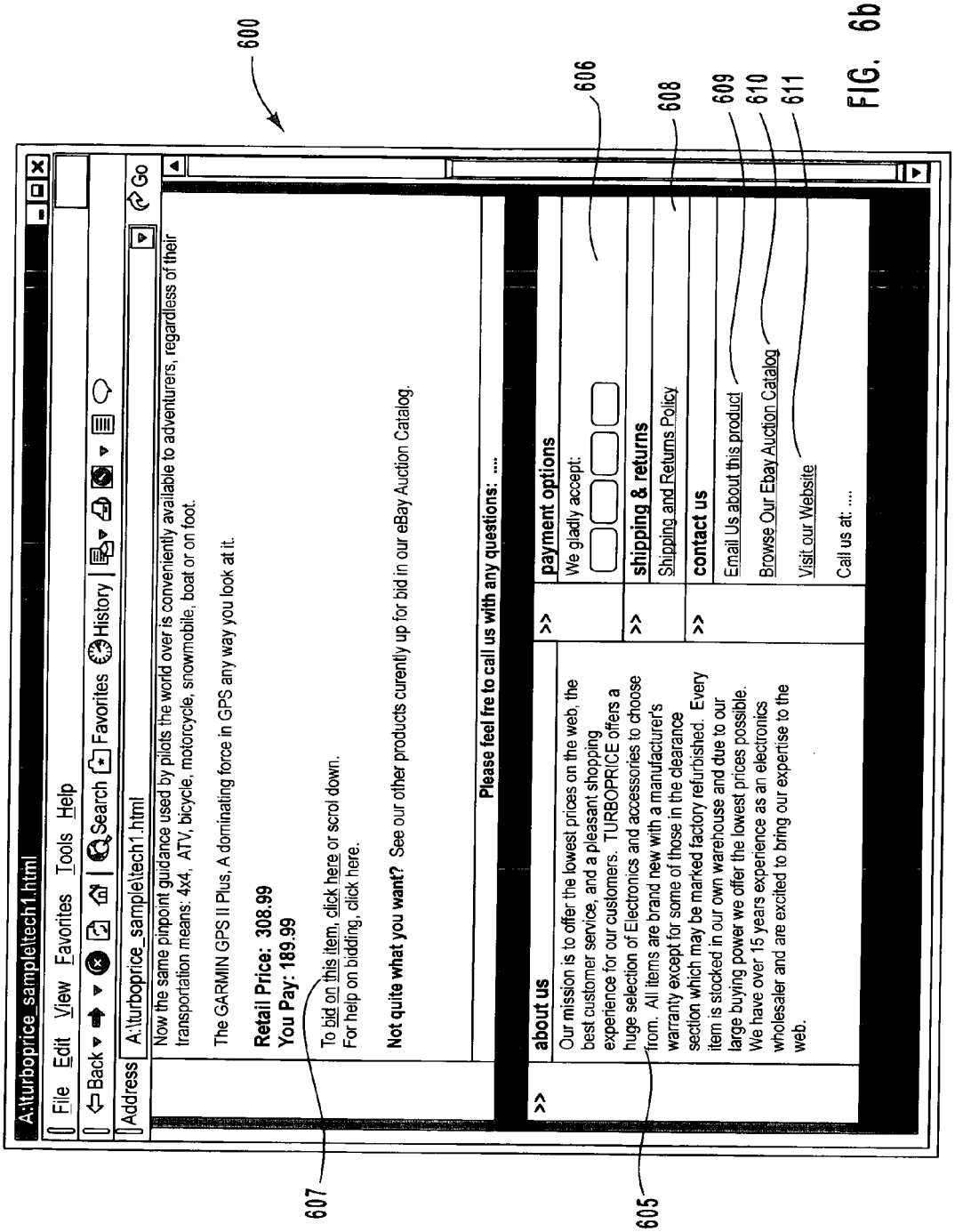

Product Page Generation 104 is the component of this invention that dynamically generates unique, custom product pages, based on the identified e-commerce sites and the particular client products. An example of a typical product page is shown in FIGS. 6a and 6b. This Product Page Generation 104 uses system templates that blend online merchandising expertise and with adaptive technology for dynamically configuring the product page to meet the requirements of a particular e-commerce marketplace.

The Data Collection/Data Mining component 105 of this invention is used to continually define and refine e-commerce marketplace filters used in selecting marketplaces and for refining product placement templates. Data is collected concerning product placement activity and sales transactions. This collected data is mined, analyzed, interpreted and combined with client-specific, transaction-based product information and customer purchasing data to optimize the appropriate e-commerce channel mix and product offerings. In the present preferred embodiment, this invention collects and stores over fifty data elements for each product posting. These data elements include such information as a product's unique description, portal characteristics, posting details, and click and bid activity. The data is analyzed after every product-posting period. The results of this analysis provide a blueprint of which product and sales variables should be modified to improve future postings. Artificial intelligence techniques are preferably employed to evaluate the data and to automatically place increasingly effective product pages on the Internet.

Figure 2:
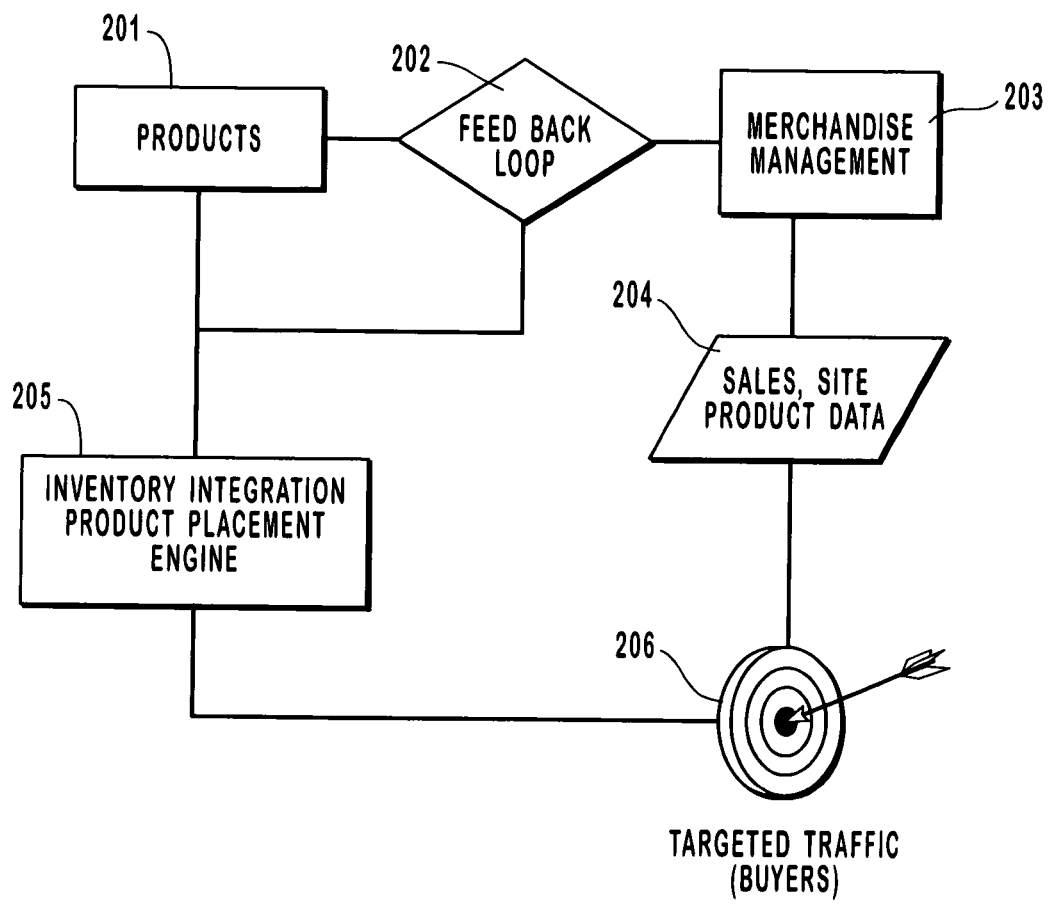
FIG. 2 is a top-level block diagram of the preferred system of this invention.

FIG. 2 shows a top-level block diagram of the preferred system of this invention. As noted above, the primary objective of this invention is to place products in front of targeted buyers, thereby resulting in e-commerce transactions. A complementary objective of this invention is to collect and evaluate data on product attributes and e-commerce activity. Once client information has been acquired, product information 201 is imported into the system and database of this invention. Typically, product information 201 is provided in comma delimited spreadsheets or database files, although other alternative organizations of product information can be collected on other formats. Automated importation of product information using XML or other technology can also be used. Once product information 201 is entered into the database, feedback 202 is provided both to clients and the product placement engine 205 of the invention. Merchandise management 203 is provided, in communication with the feedback 202, to map the product data into Web templates for placement in the e-commerce marketplace. Presently the product data is mapped initially into product categories using either manual or algorithmic automatic methods. Product pages, which are typically mini-e-commerce websites, are created in the sales, site and product data function 204, for each product. The content of the product pages is provided dynamically using the client's web server and/or a dedicated web server. The developed product pages are placed by the product placement engine 205 is such a manner as to be located where targeted traffic or buyers 206 are likely to be found.

Figure 3:
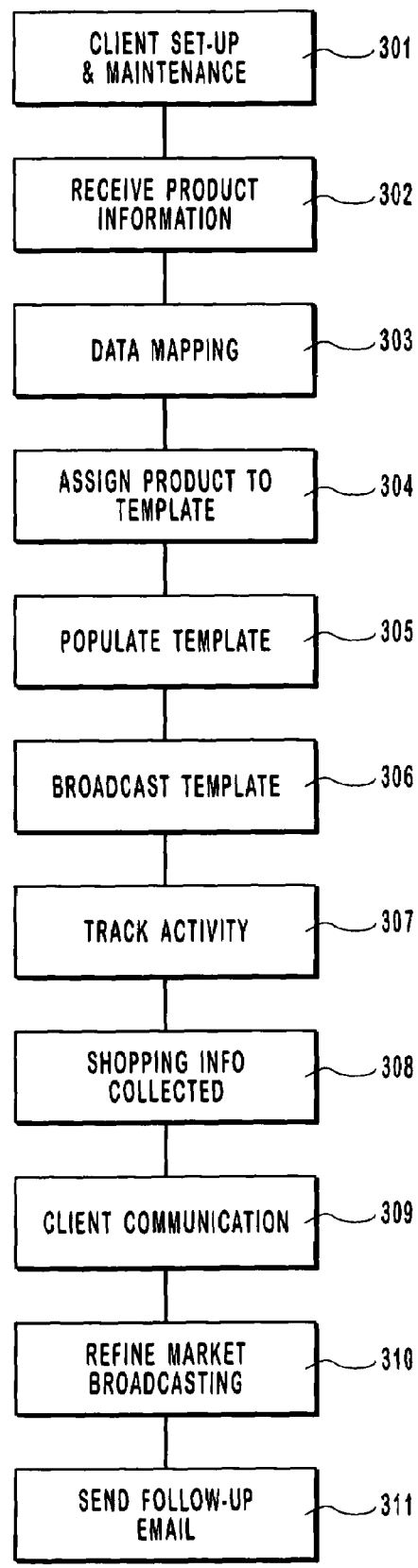
FIG. 3 is the a top-level process flow chart of the preferred method of this invention.

FIG. 3 shows the a top-level process flow chart of the preferred method of this invention. Initially client information is acquired and loaded in to a database during the Client Set-Up and Maintenance step 301. A client can be a manufacturer, a distributor, a retailer, an e-tailer, an individual or any other entity desiring to place products, services or financial instruments in the e-commerce marketplace. This step 301 provides the interface for entering such client information as name, address, contact, commerce related terms and conditions, taxes, payment options, shipping terms, credit, and returns policies. If available a client logo can also be entered in the client database. Clients may have a wide range of objectives with respect to the marketing of their products. Such objectives include, but are not necessarily limited to sales volume, profit maximization, customer development, product or corporate image enhancement or exposure. Client objectives are also entered in the client database for use in e-commerce marketplace filtering. Next, product information is received 302. As previously described, product information can be provided in a spreadsheet, a comma delimited list, an XML database or other computer file format. Typical product data includes: manufacturer product numbers, description, price, quantities available, images or paths to image, and the like. Product data is mapped 303 to a product category schema. This invention, in its preferred embodiment, provides a product category schema, which acts as an intermediary mapping for categorizing products to the various different product categories as defined by the various e-commerce sites. In its present preferred embodiment this mapping is performed using a table look-up method. Also, in this step 303, the product heading is defined. Generally, the product heading is the description used in a market place search engine. The product information is assigned to a Web template. Product templates are previously Web site forms that have incorporated therein links to facilitate e-commerce. The product templates are thus generally more than just a Web page, they are designed to be standalone e-commerce Web sites. The template is populated 305, by product data and client data. During this step, the template appearance and features are dynamically adjusted to meet the requirements and differences of each particular selected e-commerce marketplace. Pricing and other information can be adjusted and/or updated as appropriate to the market place or the change in circumstances. The populated Web template is next broadcast 306 to a network of on-line e-commerce marketplaces, for which interfaces have been written. These interfaces can be custom developed or can simply be a pseudo login, or similar means, to the marketplace site. It is worth noting that each template-generated site has a unique ID, which is associated with the client, marketplace, product, and time stamps. Marketplaces can be local, national, or international. Along with the automatic posting of product pages to e-commerce Web sites, a product catalog is also dynamically created to reflect the current products listed by a client on an individual site basis, during the broadcast step 306. Auto posting, or broadcasting, can occur in a variety of ways. Bulk upload interface specifications are published by many e-commerce sites. This invention automates the uploading even to those sites without such systems. Activity is tracked 307 with hit counters or other similar devices. The tracked activity includes such activities as: page views, marketplace connections, click throughs to client home page, view of on-line catalogs, e-mail information requests, bid activity on an auction site, orders, purchases and the like. In the preferred embodiment, orders are driven by a BUY button, and may be single click or multiple step process. After a BUY is initiated, sales and shipping or other delivery information is collected 308. This information typically includes such information as credit card verification, product, price, quantity, ship to address, payment options, tax collections, and other order information. The sales and shipping information is then communicated 309 to the client for transaction completion. Reporting to clients may include sales reports, technical and sales management reports, and sophisticated multivariate analysis, which can be used in client market research. In the present embodiment, Perl libraries and SQL Server/Crystal reports are used for generating the simple reports and SPSS and other standard statistical packages are used for doing the more complex data analysis. In its preferred embodiment, this communication is accomplished via a secure Web site, encrypted e-mail, or XML connection to the client's accounting submission. Based on the results and data gathered in the Track Activity step 307, which preferably are statistically analyzed, the market broadcasting filters are refined 310 for updating current product placement and for use in future product placement. These filters include the client objectives determined in the client set-up and maintenance step 301. The filters are used in the marketplace placement used in the data mapping of step 303. Follow-up e-mail can be sent 311 to customers for the purpose of confirming orders, collecting marketing information, customer surveys, direct sales solicitations, and the like.

Figure 4:
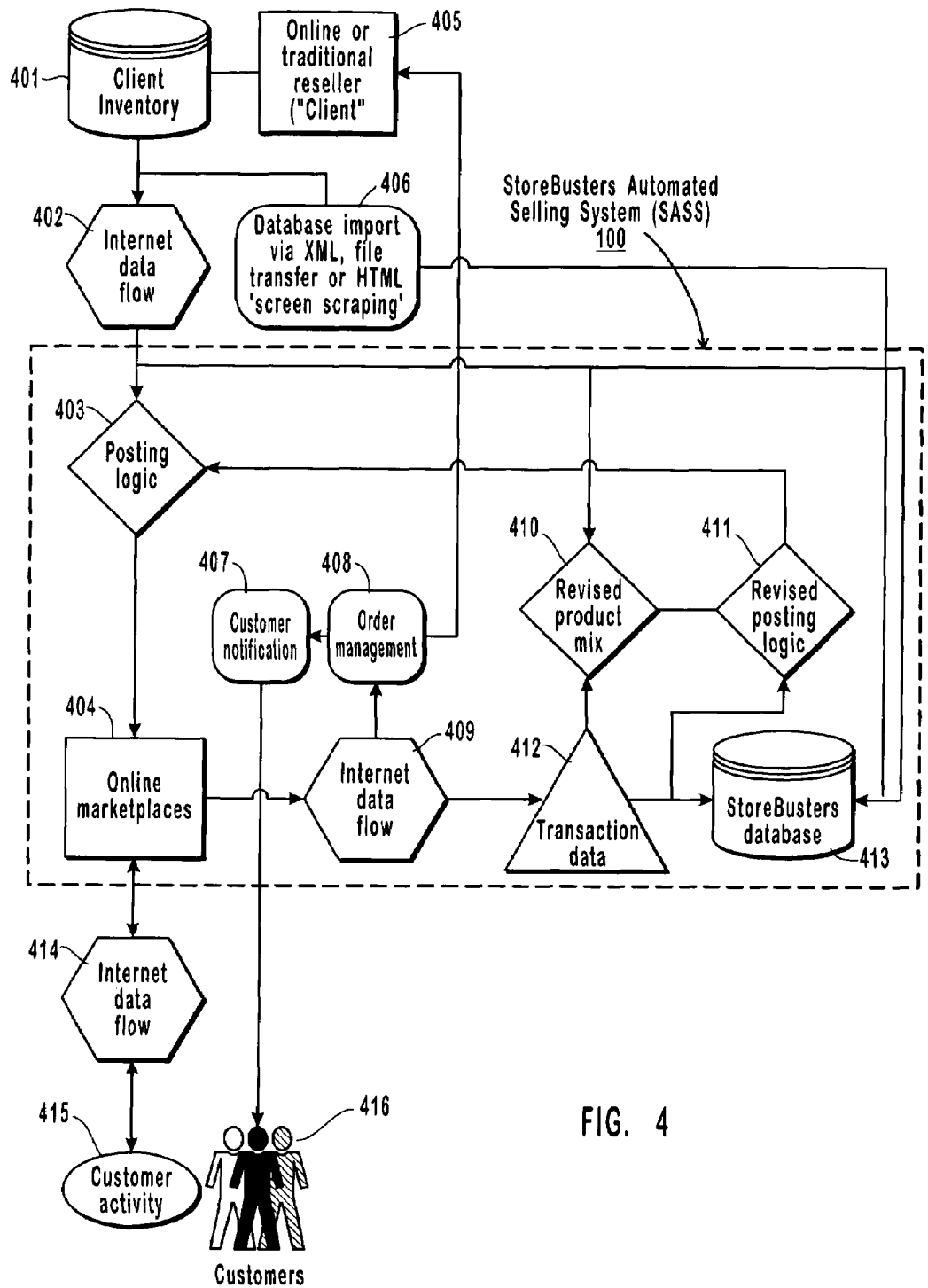
FIG. 4 is a detailed process flow diagram of the preferred method and system of this invention.

FIG. 4 shows a detailed process flow diagram of the preferred method and system of this invention. This view of the system of this invention shows the interrelationship of the various component parts of the system. Client inventory information 401 is stored in a database. This information 401 is provided by the client 405. The client inventory information 401 is passed to the Internet 402 as well as to a database import process 406. This database import process 406 is preferably accomplished via XML or file transfer of HTML (screen scrapping). The database import process 406 transfers product information to the Storebusters database 413. The Internet 402 communicates with posting logic 403, which performs the e-commerce marketplace posting function. The result of the posting logic 403 is the placement of the product information on one or more online marketplaces 404. The Internet 409 also provides the communication between the online marketplaces and order management 408 and the collection of transaction data 412. Order management 408 is linked to customer notification 407, which communicates, typically by e-mail, to the customers 416. Customers 416 interact with the online marketplaces 404 via customer activity 415 communicated over the Internet 414. Transaction data 412 is collected and stored in the Store-Busters database 413. This transaction data 412 is used to revise the posting logic 411 used in the selection of the marketplace 403. The client product information 401 can also provide a revised product mix 410 via the Internet channel 401. The components within the dashed lines are included in the preferred embodiment of the invention 100.

Figure 5:
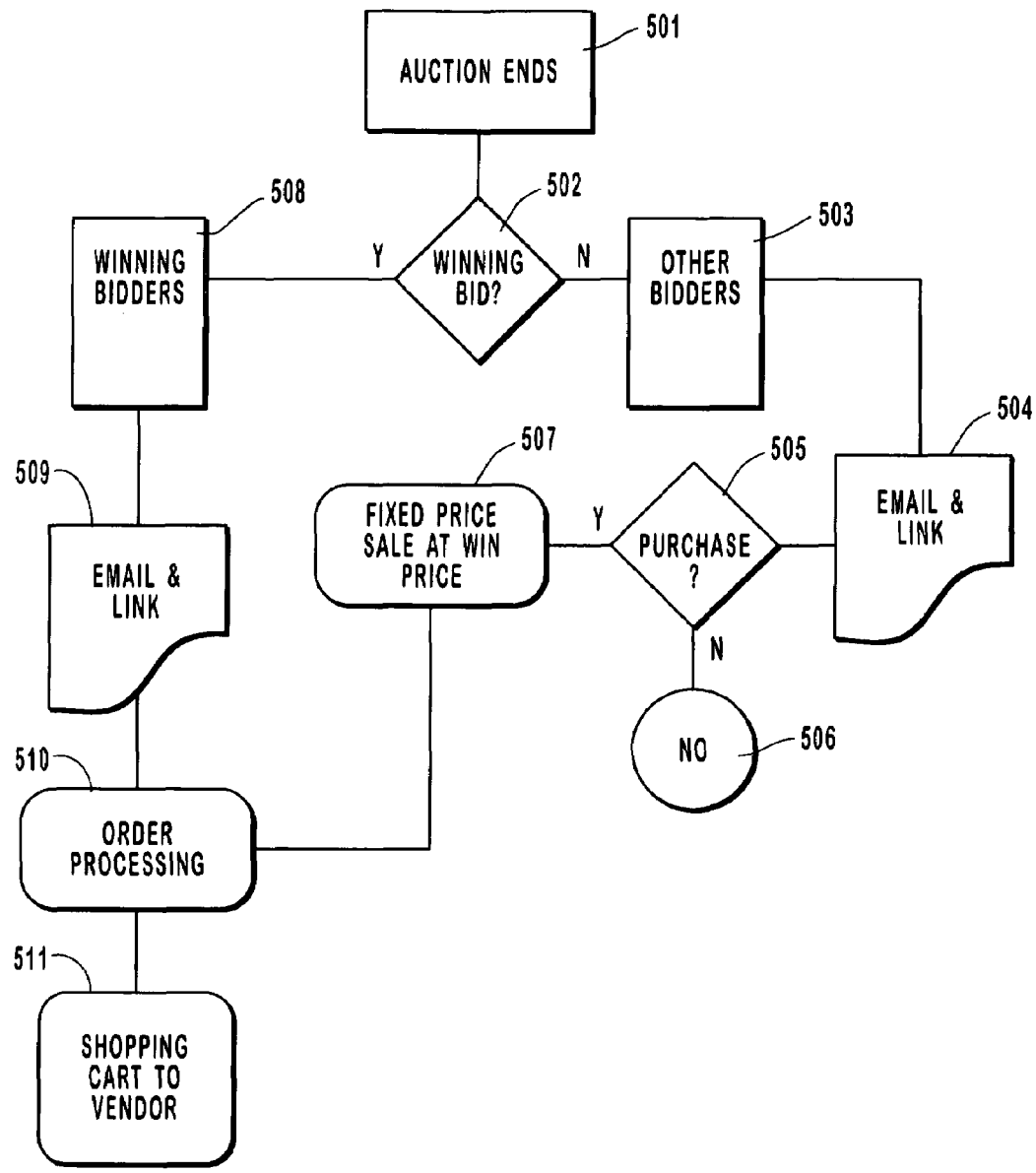
FIG. 5 is a detailed process flow diagram of the automated e-mailer process.

FIG. 5 shows a detailed process flow diagram of the automated e-mailer process. The e-mailer process 311 is used to communicate with customers, potential customers and clients. In the preferred embodiment of this invention, a series of e-mail filters parse the high volume of messages from the various auction sites. Based on the protocol of the particular auction site, confirmation of bid submission, auction status, auction end, winning bidder and other similar e-mails provide primary feedback to the bidder (or customer) and/or the client. Insignificant e-mails are generally discarded, with important e-mails forwarded to merchandize management and client. Certain e-mail will trigger scripts that that drive the product posting process. E-mail confirmation of individual product or batch uploads is typically made. An automatic e-mail function is described in this FIG. 5. When an auction ends 501 successfully (with a wining bidder), an HTML email is sent to the winning bidders 508. This e-mail 509 contains a link to a credit card payment form, which has an item and has price fields already completed. After filling in the remaining information, the winning bidder's order is sent 510 directly to vendor's warehouse for pick-up, packing and shipping 511, typically the order is sent via an XML interface. For bidders who did not win the auction 503, an HTML e-mail 504 is sent with information about the winning bid, and a link to a "Dutch auction" where they can purchase 507 the item for the winning bid price. If they make the purchase, they are directed to the credit card payment form and the order is processed 510 as described above.

FIGS. 6a and 6b show a representative product page used in this invention. Product pages, actually small Web sites, are dynamically created for each product. The content of the product pages is provided dynamically from the client's Web server and/or a dedicated system Web server. This representative product page 600, shown in FIG. 6a, has a marketplace display section 601, which identifies the e-commerce marketplace on which this product page is placed. A number of links 602 are provided for connecting to alternative Web sites, including shown here a catalog site, an information site, an e-mail portal, and other information links. An information screen 603 is provided for the display of product information. As can be seen in FIG. 6b, several links 607 are provided for placing a bid or getting help on placing a bid. A second information screen 605 is provided to give information about the marketplace site. Payment options 606, shipping and returns 609, e-mail correspondence 609, catalog, and homepage 611 links are also provided. The purpose of this example product page 600 is to show one preferred product page configuration, not to limit the product pages of this invention to this particular configuration.

Figure 7:
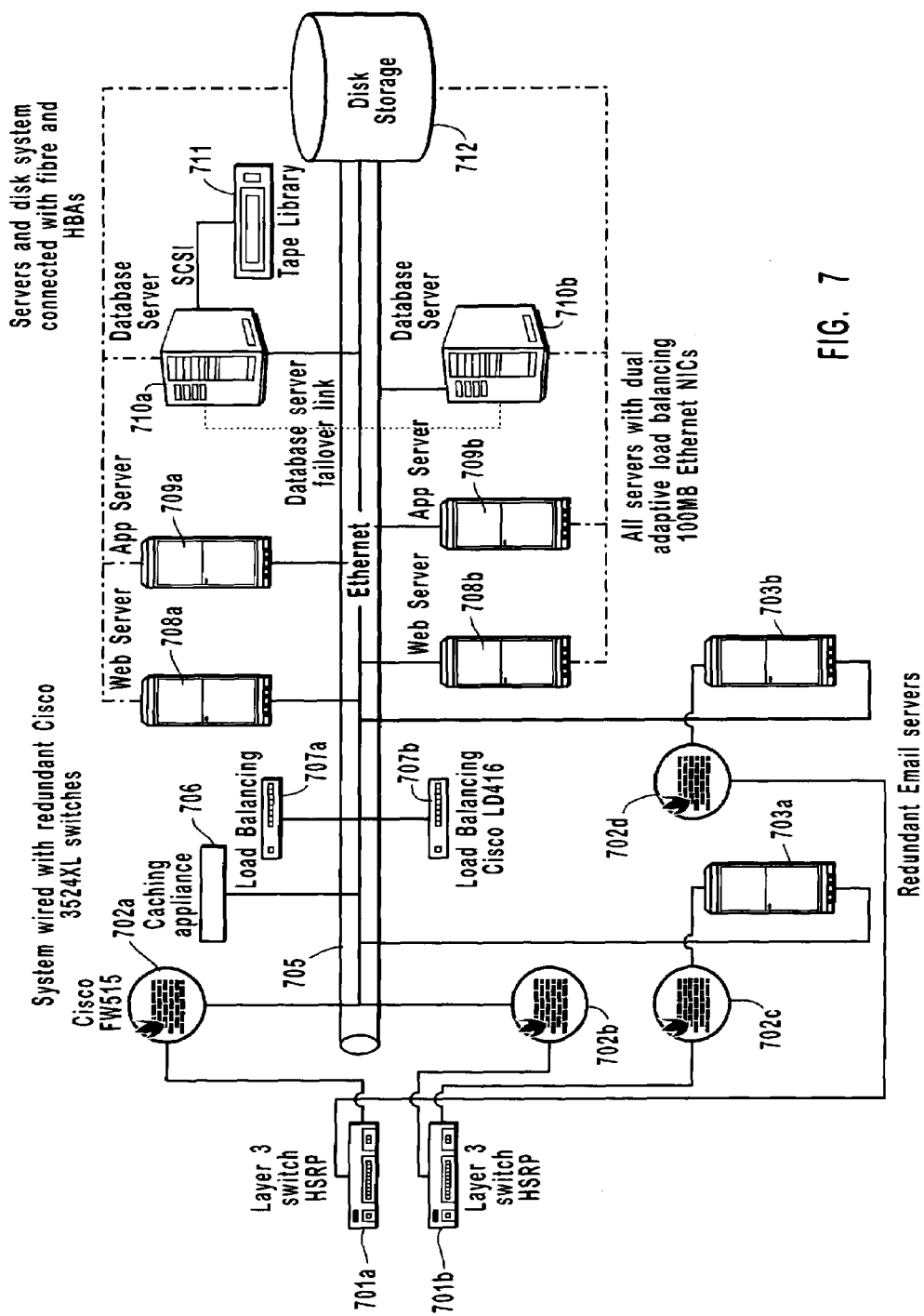
FIG. 7 is a diagram of the current preferred computer hardware and communication connections of this invention.

FIG. 7 shows a diagram of the current preferred computer hardware and communication connections of this invention. This invention makes use of specific computer software developed to perform the objectives of this invention. The preferred computer hardware on which the computer software of this invention executes is shown in this FIG. 7. The present preferred hardware communicates using an Ethernet link 705. Connected to the Ethernet link 705 is a disk storage device 712, along with a variety of servers, including at least two database servers 710a,b, at least two application servers 709a,b, at least two Web servers 708a,b, at least two redundant e-mail servers 703a,b. Load balancing hardware 707a, b is provided. At least two layer 3 switches HSRP 701a,b are connected through a set of firewalls 702a,b,c,d to the Ethernet 705 connected hardware system.

Figures 1, 8A:
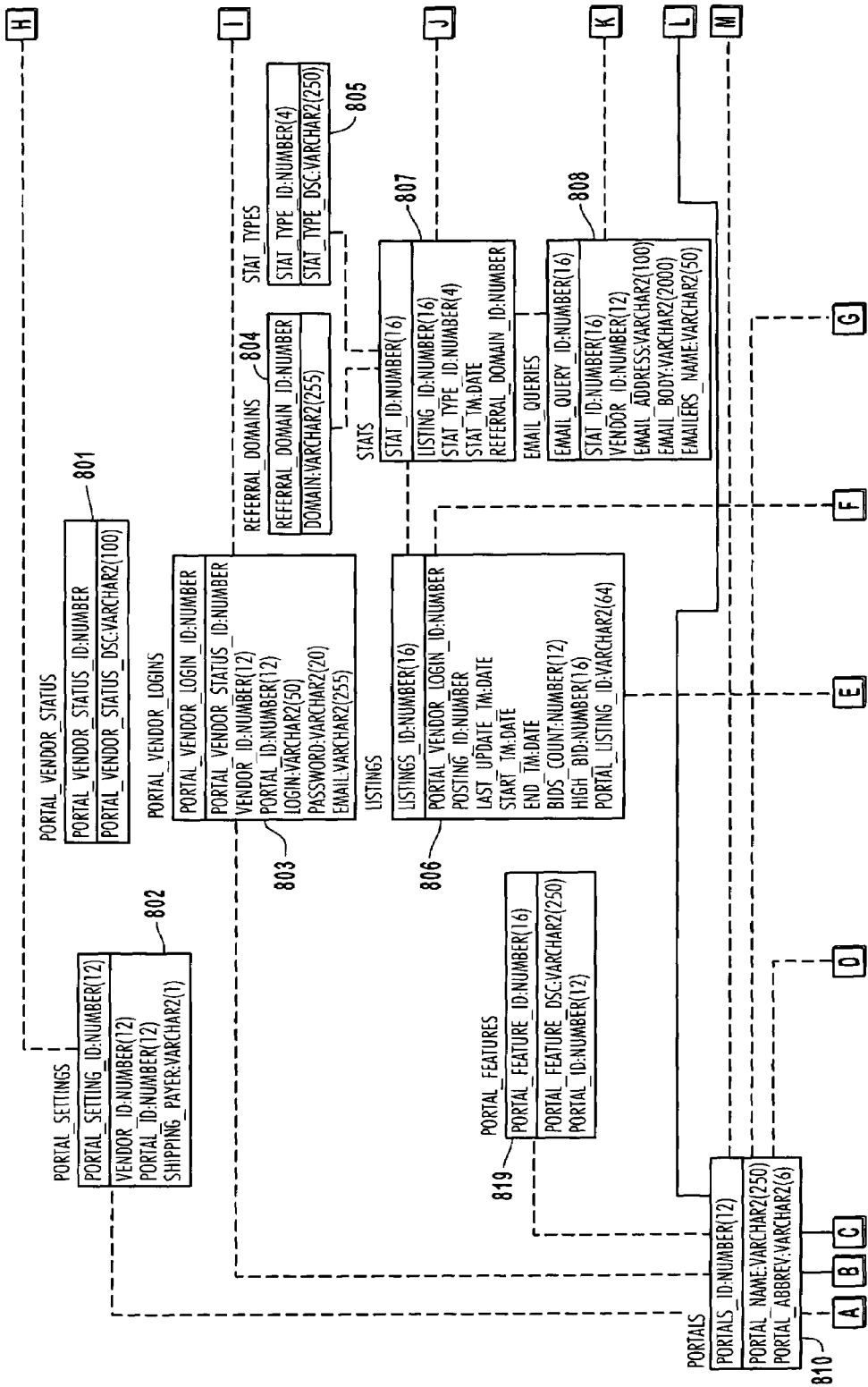
FIGS. 8a, 8b, and 8c are relationship diagrams of the present preferred database of this invention.
Figures 2, 8A:
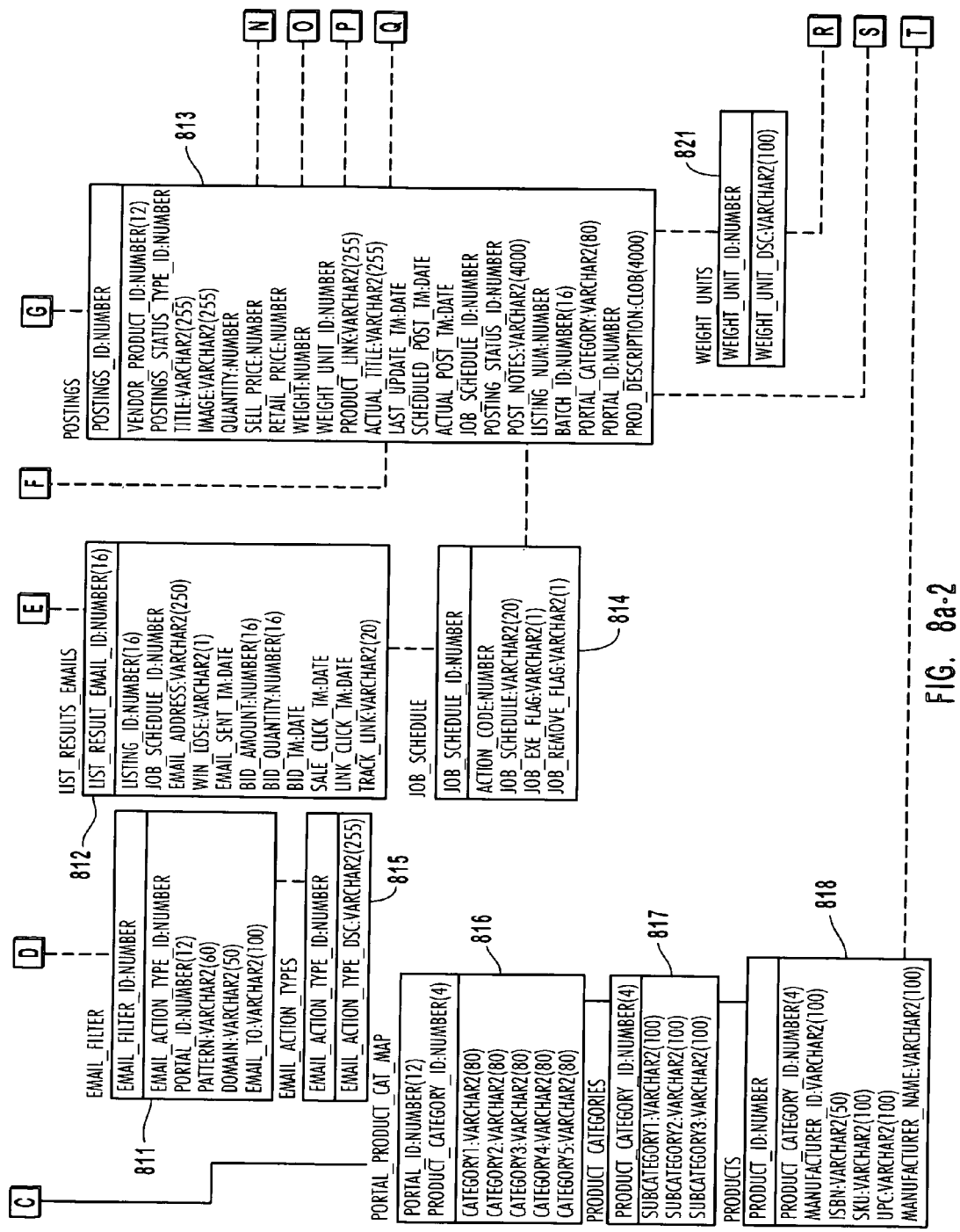
Figures 3, 8A:
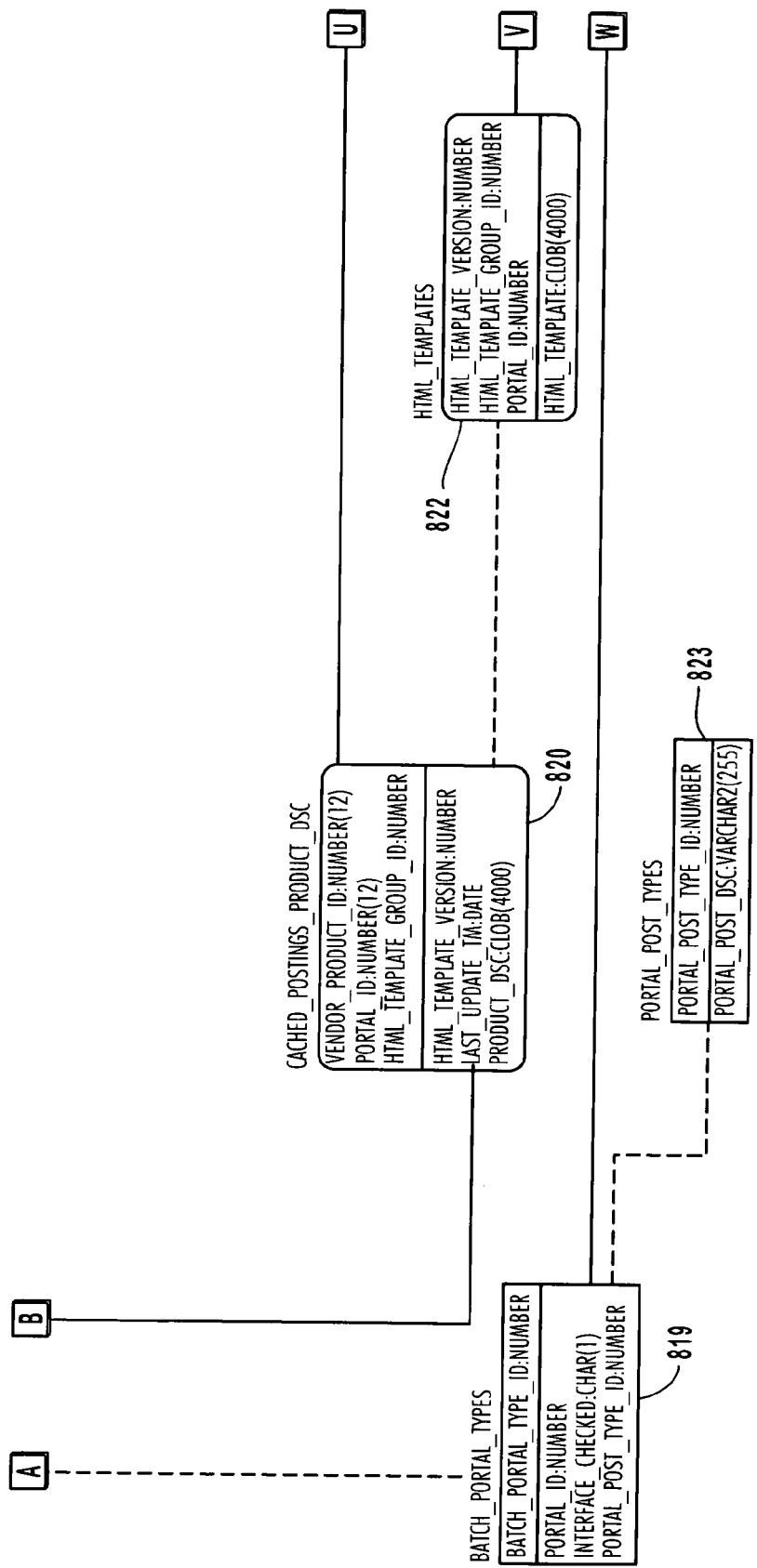
Figures 1, 8B:
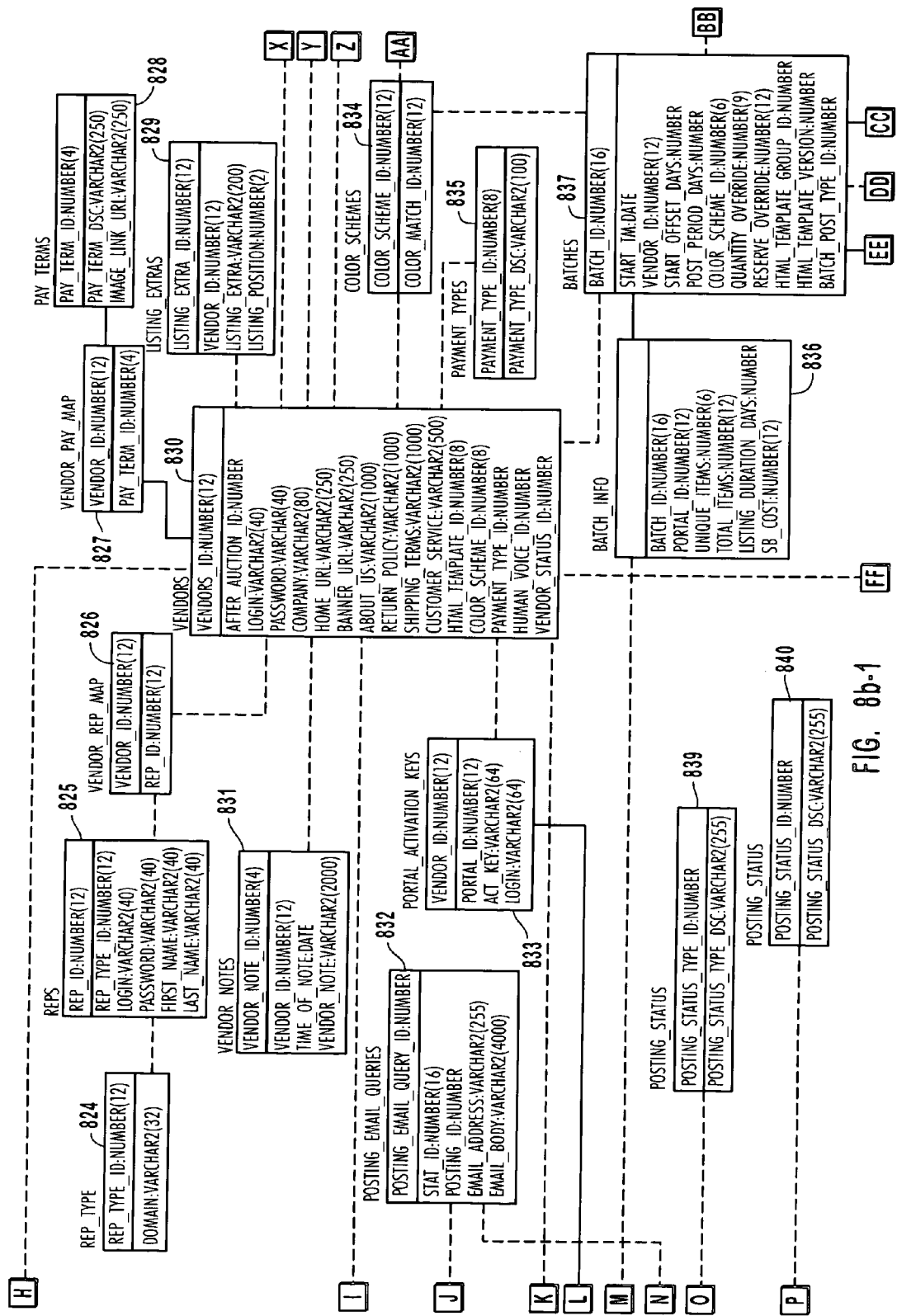
Figures 2, 8B:
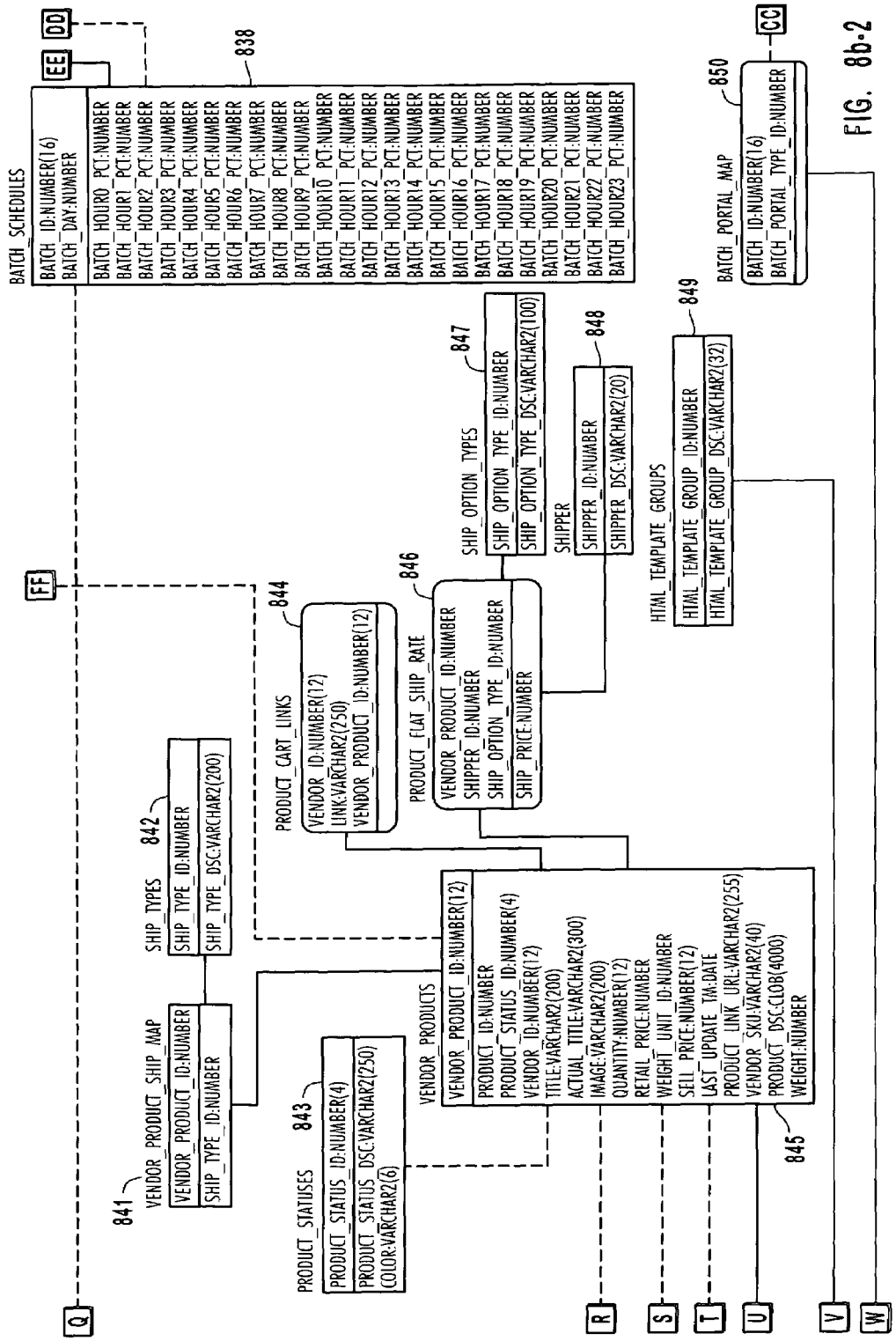
Figures 1, 8C:
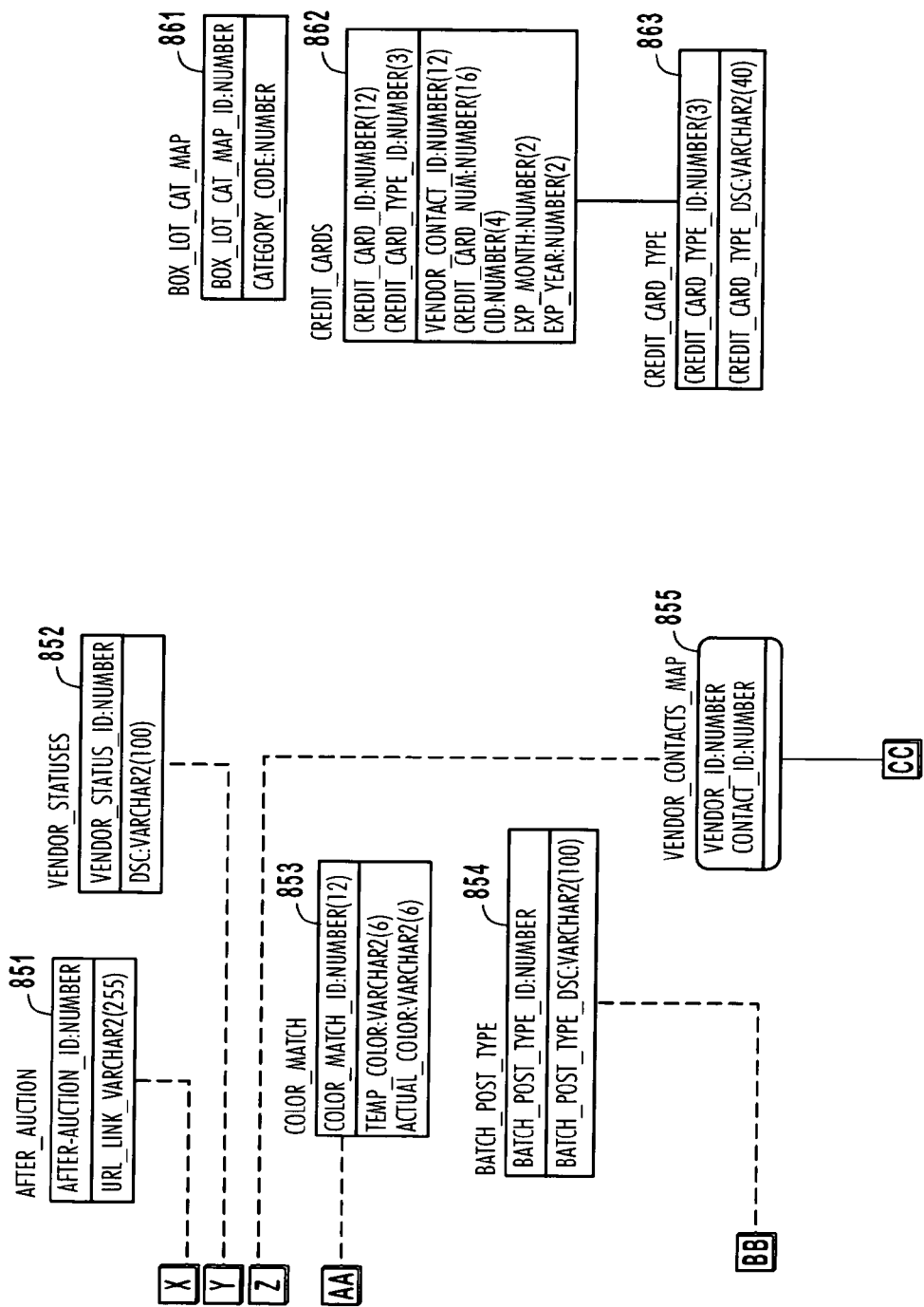
Figures 2, 8C:
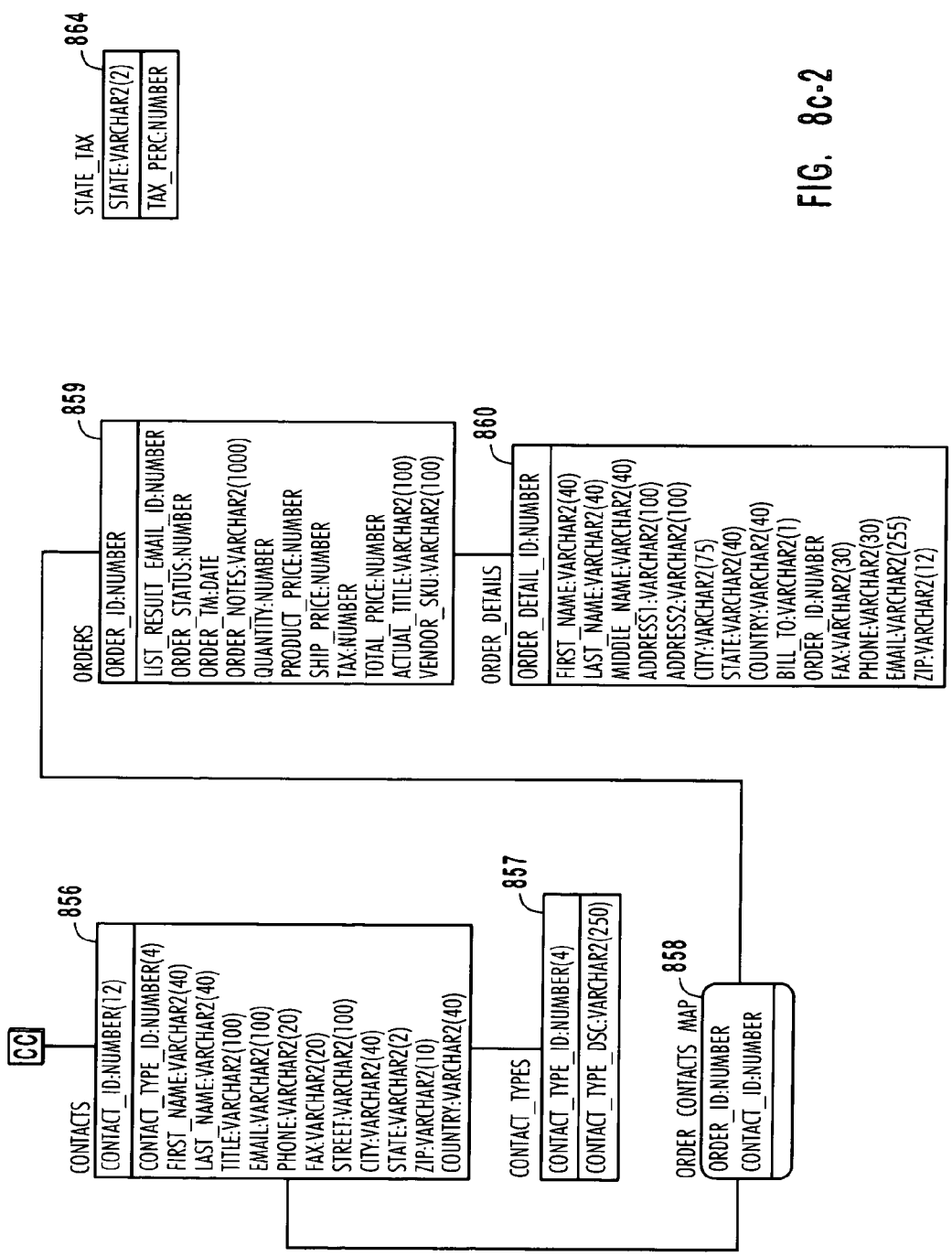

FIGS. 8a, 8b, and 8c are relationship diagrams of the present preferred database of this invention. Vendor Status 801 is connected Vendor Logins 803. Vendor Logins 803 is connected to Portals 810, Listings 806, and Vendors 830. Vendors 830 connects with Portal Settings 802, Vendor Pay Map 827, Vendor Rep. Map 826, Listing Extras 829, Vendor Notes 831, Portal Activation Keys 833, E-Mail Queries 808, Vendor Products 845, Batches 837, Payment Types 835, Color Schemes 834, After Auction 851, Vendor Stat. Uses 852, and Vendor Contacts Map 855. Portal 810 is also connected to Portal Settings 802, Portal Features 809, Batch Portal Types 819, Cashed Postings Product Desc. 820, Portal Product Cat. Map. 816, E-Mail Filter 811, Postings 813, Batch Info. 836, and Portal Activation Keys 833. Referral Domains 804 is connected to Stats 807 and Stat Types 805, which also is connected to Stats 807. Listings 806 is also connected to Postings 813 and List Results E-Mails 812. Stats 807 is also connected to E-Mail Queries 808 and Posting E-Mail Queries 832. E-Mail Filter 811 is connected to E-Mail Action Types 815. List Results E-Mails 812 is connected to Job Schedule 814. Postings 813 is also connected to Job Schedule 814, Vendor Products 845, Weight Units 821, Batches 837, Posting Status 840, Posting Status Types 839, and Posting E-Mail Queries 832. Portal Product Cat. Map 816 is connected to Product Categories 817, which is also connected to Products 818. Products 818 is also connected to Vendor Products 845. Batch Portal Types 819 is connected to Portal Post Types 823 as well as Batch Portal Map 850. Cached Postings Product Desc. 820 is connected to Vendor Products 845 and HTML Templates 822. Weight Units 821 is also connected to Vendor Products 845. HTML Templates 822 is connected to HTML Template Groups 849. Rep Type 824 is connected to Reps 825, which is connected to Vender Rep Map 826. Vendor Pay Map 827 is connected to Pay Terms 828. Color Schemes 834 is connected to Batches 837 as well as Color Match 853. Batch Info 836 is connected to Batches 837. Batches 837 is also connected to Batch Schedules 838, Batch Portal Map 850 and Batch Post Type 854. Vendor Product Ship Map 841 is connected to Ship Types 842 and Vendor Products 845. Product Statues 843 is connected to Vendor Products 845. Vendor Products 845 is also connected to Product Cart Lines 844 and Product Flat Ship Rate 846, which is also connected to Shipper 848 and Ship Options Types 847. Vendor Contacts Map 855 is connected to Contacts 856, which is also connected to Contact Types 857 and Order Contacts Map 858. Order Contacts Map 858 is connected to Orders 859, which is also connected to Order Details 860. Credit Cards 862 is connected to Credit Card Type 863. Also, provided are Box Lot Cat Map 861 and State Tax 864. This preferred data structure is provided to further enable a person of skill in the art to comprehend and use this invention, it is not provided to limit the scope of this invention. It is understood and expected that alternative data structures could be employed as a foreseeable alternative. It is the intent of the inventors that such alternatives be considered within the scope of this invention.

The foregoing description is of a preferred embodiment of the invention and has been presented for the purposes of illustration and description of the best mode of the invention currently known to the inventor. This description is not intended to be exhaustive of all possible implementations. Nor is this description intended to limit the invention to the precise form, connections, components or structure disclosed. Obvious modifications or variations are possible and foreseeable in light of the above teachings. This embodiment of the invention was chosen and described to provide the best illustration of the principles of the invention and its practical application to thereby enable one of ordinary skill in the art to employ this invention in its various embodiments and with various modifications as are suited to the particular use contemplated by the inventor. All such modifications and variations are intended to be within the scope of the invention as determined by the appended claims when they are interpreted in accordance with the breadth to which they are fairly, legally and equitably entitled.

We claim:

1. A method for refining an online marketplace selection for enhancing e-commerce, with the assistance of computer hardware and computer software, comprising the steps of:
   a. receiving product information into a product information database of a computer system;
   b. mapping said product information into product categories, in a product category database in said computer system;
   c. assigning said product information into a template, said template having an appearance and one or more features;
   d. populating said template with said product information;
   e. selecting a group of on-line marketplaces based on an on-line marketplace selection criterion, dynamically adjusting said template appearance and features based on said selected group of online marketplaces;
   f broadcasting said adjusted populated template to said group of on-line marketplaces;
   g. dynamically generating a custom product page associated with said adjusted populated template and an identified on-line marketplace from said selected group of on-line marketplaces for an individual product from said product information database to be marketed on one or more of said on-line marketplaces;
   h. tracking activity on said broadcasted template, and recording said tracked activity in an activity database in said computer system;
   i. communicating said activity to a client; and
   j. refining the on-line marketplace selection criterion, wherein said refining further comprises analyzing product placement activity, sales transaction and e-commerce marketplace filters of one or more of said selected on-line marketplaces; optimizing an e-commerce channel mix and product offerings by placing said adjusted populated template in an appropriate time and one or more of said selected on-line marketplaces based on said product placement activity and said sales transactions.

2. A method for enhancing the process of e-commerce, as recited in claim 1, further comprising receiving and storing client information.

3. A method for enhancing the process of e-commerce, as recited in claim 1, further comprising sending e-mail communication to consumers.

4. A method for enhancing the process of e-commerce, as recited in claim 1, further comprising sending report information to clients.

5. A method for enhancing the process of e-commerce, as recited in claim 1, wherein said receiving product information further comprises receiving description, price and quantity information.

6. A method for enhancing the process of e-commerce, as recited in claim 1, wherein said mapping product information provides a mapping between client products and multiple e-commerce marketplace sites.

7. A method for enhancing the process of e-commerce, as recited in claim 1, wherein said assigning product information into a template further comprises dynamically modifying the content of said template based on the selected e-commerce marketplace site.

8. A method for enhancing the process of e-commerce, as recited in claim 1, wherein said broadcasting further comprises sending a client product populated template to an online marketplace based on the results of prior e-commerce activity.

9. A method for enhancing the process of e-commerce, as recited in claim 1, wherein said tracking activity further comprises collecting data on number of Web site hits, click throughs, orders and e-mail communications.

10. A method for enhancing the process of e-commerce, as recited in claim 1, wherein said communicating activity to a client further comprises analyzing said tracked activity, producing a report and sending said report to a client.

11. A method for enhancing the process of e-commerce, as recited in claim 1, wherein said refining an online marketplace selection criteria, further comprises analyzing said tracked activity, comparing said tracked activity with a clients objectives and modifying a marketplace filter function.

12. A method for enhancing the process of e-commerce as recited in claim 1, further comprising collecting sales information from e-commerce buyers.

13. A method for enhancing the process of e-commerce, as recited in claim 12, wherein said collecting sales information from e-commerce buyers further comprises collecting credit card, product, price, address and quantity information.

14. A method for enhancing the process of e-commerce, as recited in claim 4, further comprising sending e-mail to customers.

15. A method for enhancing the process of e-commerce, as recited in claim 1, wherein said online marketplace is selected from the group consisting of online auction sites, online catalogs, comparison sale sites, classified advertisement sites, online exchange sites, and order aggregation sites.

16. A method for enhancing the process of e-commerce, as recited in claim 1, wherein said product information further comprises information selected from the group consisting of information concerning goods, information concerning services, information concerning financial information, and information concerning information sources.

* * * * *